US 012488274B2

(12) United States Patent
Blümel et al.

(10) Patent No.: US 12,488,274 B2
(45) Date of Patent: Dec. 2, 2025

(54) UNIVERSAL GATE PULSE FOR TWO-QUBIT GATES ON A TRAPPED-ION QUANTUM COMPUTER

(71) Applicant: IONQ, INC., College Park, MD (US)

(72) Inventors: Reinhold Blümel, Middletown, CT (US); Nikodem Grzesiak, Morges (CH); Ming Li, Silver Spring, MD (US); Andrii Maksymov, Hyattsville, MD (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 660 days.

(21) Appl. No.: 17/971,458

(22) Filed: Oct. 21, 2022

(65) Prior Publication Data

US 2023/0401478 A1    Dec. 14, 2023

Related U.S. Application Data

(60) Provisional application No. 63/281,525, filed on Nov. 19, 2021.

(51) Int. Cl.
G06N 10/60    (2022.01)
(52) U.S. Cl.
CPC .................. G06N 10/60 (2022.01)
(58) Field of Classification Search
CPC ..................................... G06N 10/60
See application file for complete search history.

(56) References Cited

U.S. PATENT DOCUMENTS

| | | | | |
|---|---|---|---|---|
| 10,622,978 | B1 * | 4/2020 | Debnath | H03K 3/38 |
| 12,265,884 | B2 * | 4/2025 | Blumel | G06N 10/40 |
| 2020/0372390 | A1 * | 11/2020 | Shehab | G06E 3/005 |
| 2020/0372392 | A1 * | 11/2020 | Nam | G21K 1/003 |
| 2022/0101166 | A1 * | 3/2022 | Blumel | G06N 10/00 |
| 2022/0101169 | A1 * | 3/2022 | Nam | G06N 10/00 |
| 2022/0172095 | A1 * | 6/2022 | Li | G06N 10/40 |
| 2022/0405627 | A1 * | 12/2022 | Blumel | G06N 10/40 |
| 2023/0334116 | A1 * | 10/2023 | Blumel | G06N 10/20 |
| 2023/0401478 | A1 * | 12/2023 | Blümel | G06N 10/40 |
| 2024/0296360 | A1 * | 9/2024 | Blumel | G06N 10/20 |

(Continued)

OTHER PUBLICATIONS

A.D. Pimentel, C. Erbas, S. Polstra, A systematic approach to exploring embedded system architectures at multiple abstraction levels, IEEE Trans. Comput., 55 (2) (2006).

(Continued)

Primary Examiner — David E Choi
(74) Attorney, Agent, or Firm — Patterson + Sheridan, LLP

(57) ABSTRACT

A method for performing at least a portion of a computational process includes computing a pulse function of a pulse to be applied to a first pair of trapped ions in a first ion chain based on a phase-space condition, wherein the phase-space condition is derived using equi-spaced synthetic frequencies in a frequency interval that includes a range set by a highest and a lowest motional mode frequency of the first ion chain, generating the pulse based on the computed pulse function, and applying the generated pulse to each of a second pair of trapped ions in a second ion chain to perform an entangling gate operation between the second pair of trapped ions in the second ion chain.

20 Claims, 11 Drawing Sheets

(56) References Cited

U.S. PATENT DOCUMENTS

2024/0403678 A1* 12/2024 Li .................. G06N 10/70
2025/0165845 A1* 5/2025 Blumel ............ G06N 10/40

OTHER PUBLICATIONS

R. Blümel, N. Grzesiak, and Y. Nam, Power-optimal, stabilized entangling gate between trapped-ion qubits, Nature Communications 7, 147 (2021).

N. Grzesiak, R. Blümel, K. Wright, K. M. Beck, N. C. Pisenti, M. Li, V. Chaplin, J. M. Amini, S. Debnath, J. Chen, and Y. Nam, Efficient arbitrary simultaneously entangling gates on a trapped-ion quantum computer, Nature Communications 11, 2963 (2020).

R. Blümel, N. Grzesiak, N. H. Nguyen, A. Green, M. Li, A. Maksymov, N. Linke, and Y. Nam, Efficient, stabilized two-qubit gates on a trapped-ion quantum computer, Phys. Rev. Lett. 126, 220503 (2021).

J. J. Garcia-Ripoll, P. Zoller, J. I. Cirac, Coherent control of trapped ions using off-resonant lasers, Phys. Rev. A 71, 062309 (2005).

PCT/US2022/078610, International Search Report and Written Opinion dated Jan. 16, 2024, 18 pages.

K.A. Landsman, et al., Two-qubit entangling gates within arbitrarily long chains of trapped ions, arXiv:1905.10421v2, May 28, 2019, 10 pages.

Laird Nicholas Egan, Scaling Quantum Computers With Long Chains of Trapped Ions, Dissertation, 2021, 239 pages.

M. Gries, Methods for evaluating and covering the design space during early design development, Integr. VLSI J.,38 (2004), pp. 131-183.

* cited by examiner

UNIVERSAL GATE PULSE FOR TWO-QUBIT GATES ON A TRAPPED-ION QUANTUM COMPUTER

CROSS-REFERENCE TO RELATED APPLICATIONS

This application claims the benefit to U.S. Provisional Application No. 63/281,525, filed Nov. 19, 2021, which is incorporated by reference herein.

BACKGROUND

Field

The present disclosure generally relates to an apparatus and method for performing computations using a quantum computer, and more specifically, to an apparatus and method of performing computations by performing an entangling gate operations in an ion trap quantum computer.

Description of the Related Art

As several promising architectures for quantum computing are emerging, the sizes of capable quantum computers are increasing. This inevitably leads to increased complexity of processes needed to build and operate such quantum computers. In a trapped-ion quantum computer, two-qubit entangling gates, which are elementary gates to construct arbitrary logic gates, are commonly designed and optimized separately for each pair of qubits. Thus, as the number of qubits in a quantum computer increases, the number of pairs of qubits increases quadratically and the designing of two-qubit entangling gates for all pairs of qubits becomes an increasingly demanding task.

Therefore, there is a need for methods for designing an apparatus and method for performing two-qubit entangling gates without the increased complexity as the number of qubits increases.

SUMMARY

Embodiments of the disclosure include a method for performing at least a portion of a computational process. The method includes computing a pulse function of a pulse to be applied to a first pair of trapped ions in a first ion chain based on a phase-space condition, wherein the phase-space condition is derived using equi-spaced synthetic frequencies in a frequency interval that includes a range set by a highest and a lowest motional mode frequency of the first ion chain, generating the pulse based on the computed pulse function, and applying the generated pulse to each of a second pair of trapped ions in a second ion chain to perform an entangling gate operation between the second pair of trapped ions in the second ion chain.

Embodiments of the disclosure also include an ion trap quantum computing system. The ion trap quantum computing system includes a quantum processor comprising a first ion chain comprising a plurality of trapped ions, each trapped ion having two hyperfine states and defining a qubit, one or more lasers configured to emit a laser beam, which is provided to plurality of trapped ions in the first ion chain, a classical computer configured to perform operations including computing a pulse function of a pulse to be applied to a first pair of trapped ions in a second ion chain based on a phase-space condition, wherein the phase-space condition is derived using equi-spaced synthetic frequencies in a frequency interval that includes a range set by a highest and a lowest motional mode frequency of the second ion chain, and generating the pulse based on the computed pulse function, and a system controller configured to execute a control program to control the one or more lasers to perform operations on the quantum processor, the operations including applying the generated pulse to each of a second pair of trapped ions in the first ion chain to perform an entangling gate operation between the second pair of trapped ions in the first ion chain, and measuring population of qubit states in the quantum processor, wherein the classical computer is further configured to output the measured population of qubit states in the quantum processor.

Embodiments of the disclosure further provide an ion trap quantum computing system. The ion trap quantum computing system includes a classical computer, a quantum processor comprising a first ion chain comprising a plurality of trapped ions, each trapped ion having two hyperfine states and defining a qubit, a system controller configured to execute a control program to control one or more lasers to perform operations on the quantum processor, and non-volatile memory having a number of instructions stored therein which, when executed by one or more processors, causes the ion trap quantum computing system to perform operations including computing, by the classical computer, a pulse function of a pulse to be applied to a first pair of trapped ions in a second ion chain based on a phase-space condition, wherein the phase-space condition is derived using equi-spaced synthetic frequencies in a frequency interval that includes a range set by a highest and a lowest motional mode frequency of the second ion chain, generating, by the classical computer, the pulse based on the computed pulse function, applying, by the system controller, the generated pulse to each of a second pair of trapped ions in the first ion chain to perform an entangling gate operation between the second pair of trapped ions in the first ion chain, measuring, by the system controller, population of qubit states in the quantum processor, and outputting, by the classical computer, the measured population of qubit states in the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
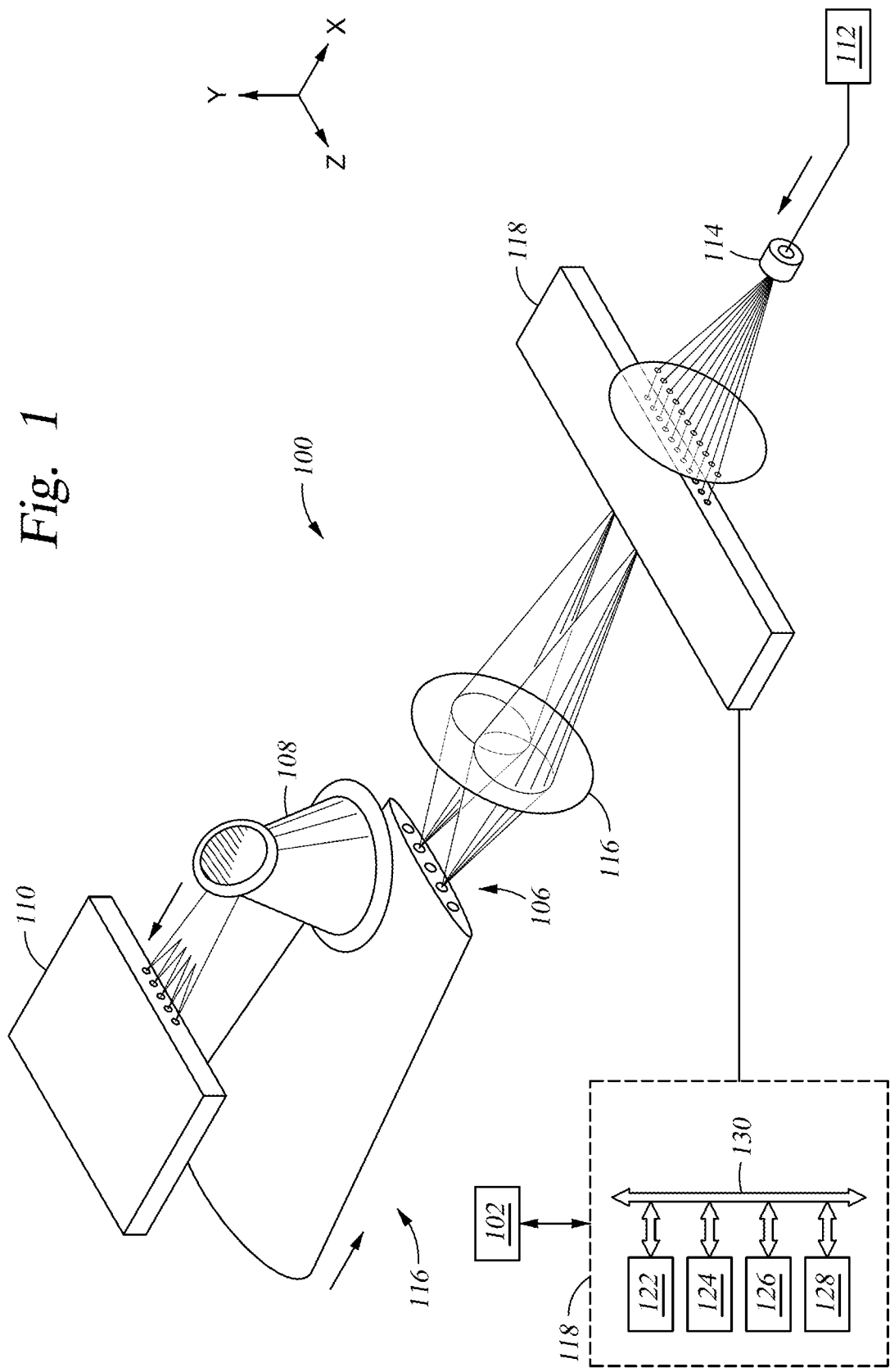
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are related to pulse shaping methods that can be used to perform two-qubit entangling gate operations universally on an arbitrary pair of ions in an ion chain of an arbitrary length. This universal gate pulse, once designed for a particular pair of ions in an ion chain, can be applied to other pairs of ions in the ion chain.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal logic gates, translating the series of universal logic gates into laser pulses to apply on the quantum register, and pre-calculating parameters that optimize the laser pulses by use of a central processing unit (CPU). During a computational operation that was initiated on a classical computer, a software program for performing the task of decomposing and executing the quantum algorithms, which is stored in a non-volatile memory within the classical computer, is used to initiate the completion of complex computational tasks by use of the quantum register. The quantum register includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer. The software in the classical computer will then use the results received from the quantum register to complete the computational operation that was originally initiated on the classical computer.

General Hardware Configurations

FIG. 1 is a schematic partial view of an ion trap quantum computing system 100, or simply the system 100, according to one embodiment. The system 100 can be representative of a hybrid quantum-classical computing system. The system 100 includes a classical (digital) computer 102 and a system controller 104. Other components of the system 100 shown in FIG. 1 are associated with a quantum processor, including a chain 106 of trapped ions (i.e., five shown as circles about equally spaced from each other) that extend along the Z-axis. Each ion in the chain 106 of trapped ions is an ion having a nuclear spin I and an electron spin s such that a difference between the nuclear spin I and the electron spin s is zero, such as a positive ytterbium ion, $^{171}Yb^+$, a positive barium ion $^{133}Ba^+$, a positive cadmium ion $^{111}Cd^+$ or $^{113}Cd^+$, which all have a nuclear spin $$I = \frac{1}{2}$$

and the $^2S_{1/2}$ hyperfine states. In some embodiments, all ions in the chain 106 of trapped ions are the same species and isotope (e.g., $^{171}Yb^+$). In some other embodiments, the chain 106 of trapped ions includes one or more species or isotopes (e.g., some ions are $^{171}Yb^+$ and some other ions are $^{133}Ba^+$). In yet additional embodiments, the chain 106 of trapped ions may include various isotopes of the same species (e.g., different isotopes of Yb, different isotopes of Ba). The ions in the chain 106 of trapped ions are individually addressed with separate laser beams. The classical computer 102 includes a central processing unit (CPU), memory, and support circuits (or I/O) (not shown). The memory is connected to the CPU, and may be one or more of a readily available memory, such as a read-only memory (ROM), a random-access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 (or some other imaging device) for measurement of individual ions. Raman laser beams from a laser 112, which are provided along the X-axis, perform operations on the ions. A diffractive beam splitter 114 creates an array of Raman laser beams 116 that are individually switched using a multi-channel acousto-optic modulator (AOM) 118. The AOM 118 is configured to selectively act on individual ions by individually controlling emission of the Raman laser beams 116. A global Raman laser beam 120, which is non-copropagating to the Raman laser beams 116, illuminates all ions at once from a different direction. In some embodiments, rather than a single global Raman laser beam 120, individual Raman laser beams (not shown) can be used to each illuminate individual ions. The system controller (also referred to as an "RF controller") 104 controls the AOM 118 and thus controls intensities, timings, and phases of laser pulses to be applied to trapped ions in the chain 106 of trapped ions. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by the CPU 122 in order to perform various functionalities associated with receiving and analyzing data and controlling any and all aspects of the methods and hardware used to implement and operate the ion trap quantum computing system 100 discussed herein.

Figure 2:
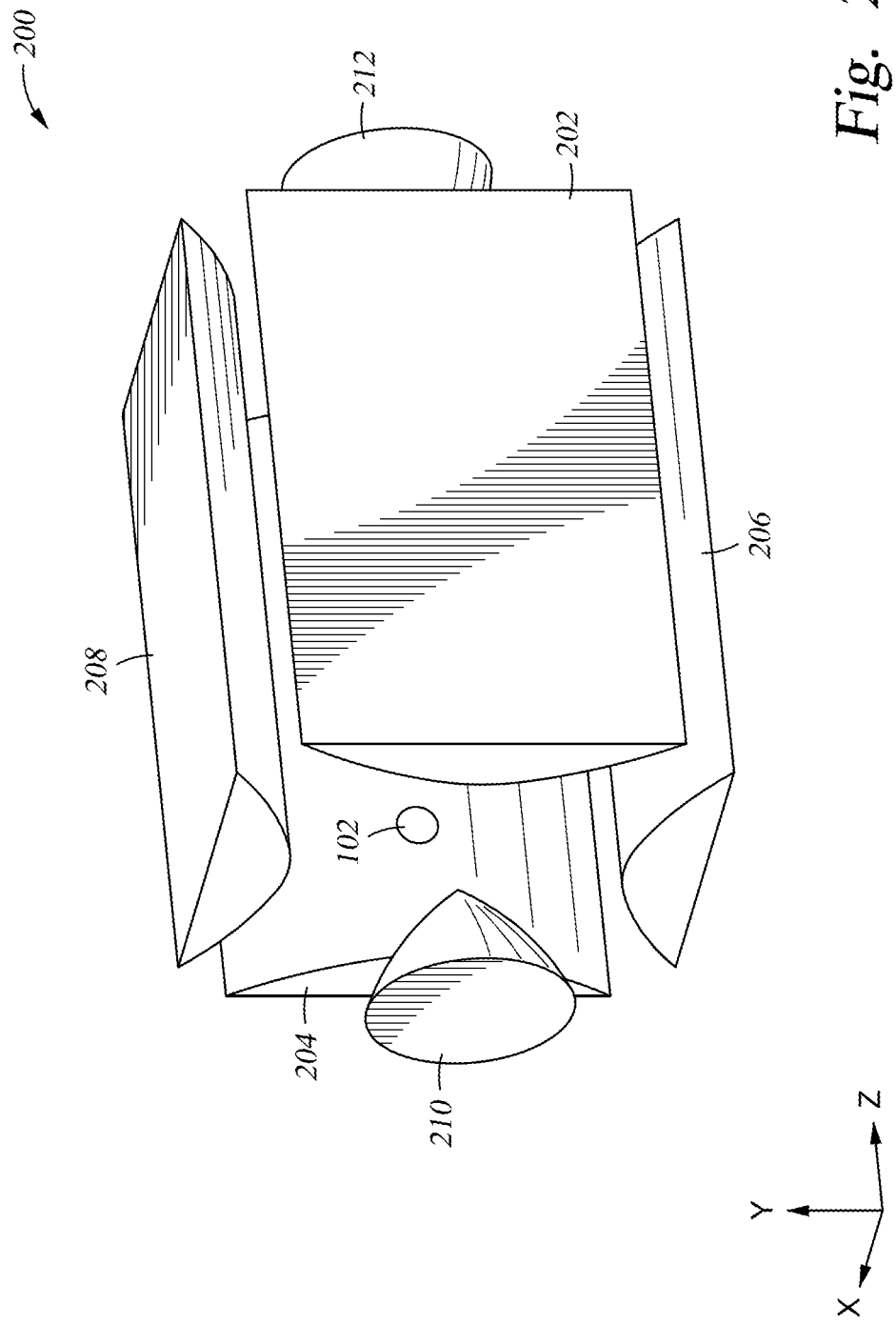
FIG. 2 depicts a schematic view of an ion trap for confining ions in a group according to one embodiment.

FIG. 2 depicts a schematic view of an ion trap 200 (also referred to as a Paul trap) for confining ions in the chain 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the chain 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to the distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Although not shown, a different type of trap is a microfabricated trap chip in which a similar approach as the one described above is used to hold or confine ions or atoms in place above a surface of the micro-fabricated trap chip. Laser beams, such as the Raman laser beams described above, can be applied to the ions or atoms as they sit just above the surface.

Figure 3:
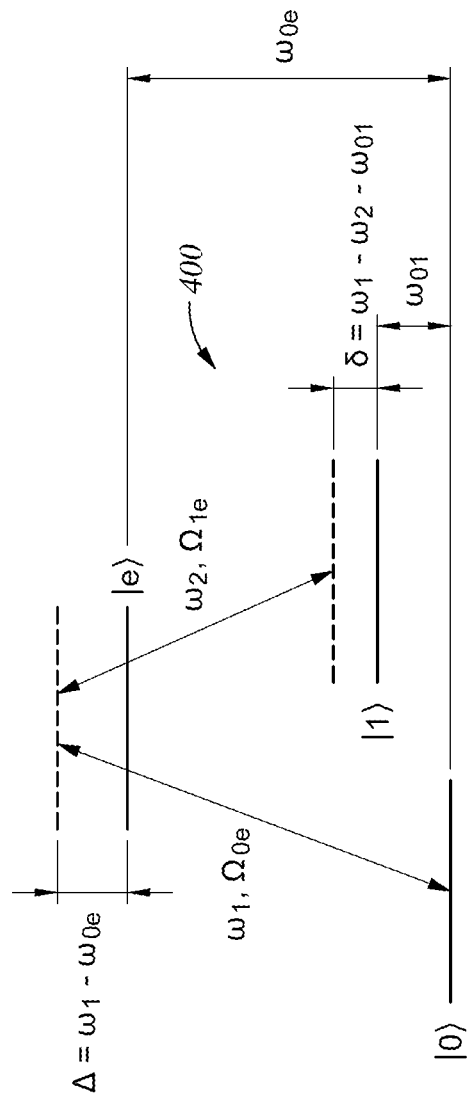
FIG. 3 depicts a schematic energy diagram of each ion in a group of trapped ions according to one embodiment.

FIG. 3 depicts a schematic energy diagram 300 of each ion in the chain 106 of trapped ions according to one embodiment. Each ion in the chain 106 of trapped ions is an ion having a nuclear spin I and an electron spin s such that the difference between the nuclear spin I and the electron spin s is zero. In one example, each ion may be a positive Ytterbium ion, $^{171}Yb^+$ which has a nuclear spin $$I = \frac{1}{2}$$

and the $^2S_{1/2}$ hyperfine states with an energy split corresponding to a frequency difference (referred to as a "carrier frequency") of $\omega_{01}/2\pi=12.642812$ GHz. In other examples, each ion may be a positive barium ion $^{133}Ba^+$, a positive cadmium ion $^{111}Cd^+$ or $^{113}Cd^+$, which all have a nuclear spin $$I = \frac{1}{2}$$

and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state for any motional mode with no phonon excitation by known laser cooling methods, such as Doppler cooling or resolved sideband cooling, and then the qubit state prepared in the hyperfine ground state $|0\rangle$ by optical pumping.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_1$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg^+$, and $Ba^+$) or transition metal ions ($Zn^+$, $Hg^+$, $Cd^+$).

Entangling Gate Operations

In an ion trap quantum computer, the motional modes of a chain 106 of trapped ions, which arise from their Coulombic interaction between the ions may act as a data bus to mediate entanglement between two-qubit ions (i-th ion and j-th ion) in a chain 106 of trapped ions and this entanglement is used to perform an XX gate operation between the two ions. That is, each of the two ions is entangled with the motional modes, and then the entanglement is transferred to an entanglement between the two ions by using motional sideband excitations as known in the art. Specifically, a combined state of two ions (i-th and j-th ions) is transformed by applying a laser pulse consisting of composite pulses on the motional sidebands to the two ions for a gate duration $\tau$, where the laser pulse is shaped over the gate duration $\tau$ such that the transformation of the combined state follows an intended XX gate operation (referred to as a "gate angle condition"), while states of remaining trapped ions in the chain 106 remain unchanged at the end of the gate duration $\tau$ (referred to as a "phase-space condition"). The gate angle condition and the phase-space condition together are referred to as "gate operation conditions" hereinafter. Techniques for shaping such a laser pulse are typically based on amplitude modulation, frequency modulation, or phase modulation of a laser pulse over the gate duration $\tau$. Among those techniques, there has been proposed an exact and computationally efficient pulse shaping technique, referred to as an exact amplitude-and-frequency modulated (E-AMFM) method herein, that provides a laser pulse shaping to execute an exact XX gate operation with 100% fidelity (i.e., the gate operation conditions are exactly fulfilled). The E-AMFM method can further provide features, such as active stabilization of fidelity of the XX gate operation up to a desired degree K with respect to motional mode frequency drift $\Delta\omega_p$ (referred to as a "stabilization conditions" hereinafter), and power optimization of laser pulses (referred to as a "power optimization condition"). It should be noted that the number of gate operation conditions increases as the number of ions in the chain 106 of trapped ions, and/or the number of active stabilization conditions, equal to the degree K of the active stabilization, increases. Thus, for a long chain 106 of trapped ions (i.e., the number of ions in the chain 106 is large) and/or for a higher degree K of active stabilization, a laser pulse must be shaped such that more conditions must be fulfilled to execute an exact XX gate operation, reducing degrees of freedom (i.e., possible values of amplitudes and phases) in selecting a power-optimal pulse shaping. In the example described below, the same laser pulse is applied to both the i-th and the j-th ions. However, in some embodiments, different laser pulses are applied to the i-th and the j-th ions.

In the following, the pulse-shaping method is described in more detail. First, the amplitude modulation and the detuning modulation of the laser pulse are referred to as an amplitude function $\Omega(t)$ and a detuning frequency function $\mu(t)$, respectively. Furthermore, a pulse function $g(t)$ of the laser pulse defined as $g(t)=\Omega(t)\sin[\int_0^t \mu(t)dt]$ is used and may be decomposed using basis functions $Q_n(t)$ ($n=1, 2, \ldots, N_A$) as $$g(t) = \sum_{n=1}^{N_A} A_n Q_n(t),$$

where $A_n$ are control parameters associated with the basis functions $Q_n(t)$ ($n=1, 2, \ldots, N_A$). In the example described below, sine functions $\sin$ $$\left(\frac{2\pi n}{\tau}t\right)$$

are used as the basis functions $Q_n(t)$. However, the basis functions $Q_n(t)$ can be any functions that are orthogonal to one another. The number $N_A$ of basis functions $Q_n(t)$ is a sufficiently large number chosen to achieve convergence.

The transformation of the combined state of two qubits (i-th and j-th qubits) by the application of the laser pulse can be described in terms of an entangling interaction $\chi_{ij}$ as follows:

$|0\rangle_i|0\rangle_j \rightarrow \cos(2\chi_{ij})|0\rangle_i|0\rangle_j - i\sin(2\chi_{ij})|1\rangle_i|1\rangle_j$ $|0\rangle_i|1\rangle_j \rightarrow \cos(2\chi_{ij})|0\rangle_i|1\rangle_j - i\sin(2\chi_{ij})|1\rangle_i|0\rangle_j$ $|1\rangle_i|0\rangle_j \rightarrow -i\sin(2\chi_{ij})|0\rangle_i|1\rangle_j + \cos(2\chi_{ij})|1\rangle_i|0\rangle_j$ $|1\rangle_i|1\rangle_j \rightarrow -i\sin(2\chi_{ij})|0\rangle_i|0\rangle_j + \cos(2\chi_{ij})|1\rangle_i|1\rangle_j$ where the entangling interaction $\chi_{ij}$ can be written in terms of the pulse function $g(t)$ as, $$\chi_{ij} = \sum_{p=1}^{P} \eta_p^i \eta_p^j \int_0^\tau dt_2 \int_0^{t_2} dt_1 g(t_2) g(t_1) \sin[\omega_p(t_2 - t_1)].$$

$\eta_p^i$ is the Lamb-Dicke parameter that quantifies the coupling strength between the i-th ion and the p-th motional mode having the frequency $\omega_p$. A maximally entangling gate that corresponds to a transformation of the combined state of two qubits $|0\rangle_i|0\rangle_j \rightarrow |0\rangle_i|0\rangle_j - i|1\rangle_i|1\rangle_j$ $|0\rangle_i|1\rangle_j \rightarrow |0\rangle_i|1\rangle_j - i|1\rangle_i|0\rangle_j$ $|1\rangle_i|0\rangle_j \rightarrow -i|0\rangle_i|1\rangle_j + |1\rangle_i|0\rangle_j$ $|1\rangle_i|1\rangle_j \rightarrow -i|0\rangle_i|0\rangle_j + |1\rangle_i|1\rangle_j$ is achieved when $$\chi_{ij} = \frac{\pi}{8}$$

is satisfied.

The phase-space condition described above requires that the trapped ions in the chain 106 that are displaced from their initial positions as the motional modes are excited by the delivery of the laser pulse return to their initial positions. A l-th trapped ion in the chain 106 in a superposition state $|0\rangle \pm |1\rangle$ is displaced due to the excitation of the p-th motional mode during the gate duration $\tau$ and follows the trajectories $\pm\alpha_p^l(t')$ in phase space (position and momentum) of the p-th motional mode. The phase-space trajectories $\alpha_p^l(t')=-\eta_p^l\int_0^{t'}g(t)e^{i\omega_p t}dt$ are determined by the amplitude function $\Omega(t)$ and the detuning function $\mu(t)$ of the laser pulse applied to the l-th trapped ion. Thus, for the chain 106 of N trapped ions, the condition $\alpha_p^l(\tau)=0$ (i.e., the trajectories $\alpha_p^l(\tau)$, l=i,j are closed) must be imposed for all the P motional modes (p=1, 2, ..., P, P=N).

The stabilization conditions of order K with respect to motional mode frequency drift $\Delta\omega_p$ can be described as $$\left(\frac{\partial^k}{\partial\omega_p^k}\right)\alpha_p^l(\tau) = -\left(\frac{\partial^k}{\partial\omega_p^k}\right)\eta_p^l\int_0^{\tau}g(t)e^{i\omega_p t}dt = 0$$

$$(l = i, j, \quad p = 1, 2, \dots, P, \quad k = 1, 2, \dots, K).$$

Alternatively, the phase-space condition and the stabilization conditions of order K can be written together as $$\left(\frac{\partial^k}{\partial\omega_p^k}\right)\alpha_p^l(\tau) = -\left(\frac{\partial^k}{\partial\omega_p^k}\right)\eta_p^l\int_0^{\tau}g(t)e^{i\omega_p t}dt = 0.$$

$$(l = i, j, \quad p = 1, 2, \dots, P, \quad k = 0, 1, 2, \dots, K).$$

These conditions can be written in matrix form as $$\sum_{n=1}^{N_A}M_{pn}^k A_n = M\vec{A} = 0 \ (p = 1, 2, \dots, P, \ k = 0, \dots, K),$$

where the matrix element M p k ii is defined as $$M_{pn}^k = -\left(\frac{\partial^k}{\partial\omega_p^k}\right)$$

$$\int_0^{\tau}\sin\left(\frac{2\pi n}{\tau}t\right)e^{i\omega_p t}dt(k = 0, \dots, K, p = 1, 2, \dots, P, n = 1, 2, \dots, N_A),$$

assuming that the same pulse is applied to the i-th and j-th ions. A similar matrix form obtains if different pulses are applied to the i-th and j-th ions.

The gate angle condition requires that the entangling interaction $\chi_{ij}$ generated between the i-th and j-th ions by the laser pulse has a desired value $\theta_{ij}$. The XX-gate operation with maximal entanglement can be executed with $|\theta_{ij}|=\pi/8$.

Universal Gate Pulse

In the embodiments described herein, a universal gate pulse that approximately satisfies the phase-space condition described above, but in turn can be applied to an arbitrary pair of ions of an ion chain that has an arbitrary length is devised.

In constructing a pulse function of a universal gate pulse (also referred to as a "universal pulse function") $g^{(u)}(t)$ that causes an XX gate operation between a pair of ions, the phase-space condition and stabilization conditions described above are replaced by an approximate phase-space condition and approximate stabilization conditions, respectively, in which the frequencies $\omega_p$ of the motional modes p (also referred to simply as "motional mode frequencies") are replaced with a set of equi-spaced synthetic frequencies (also referred to as "grid frequencies") $\hat{\omega}_q$ within a frequency interval of the motional mode frequencies. The frequency interval is set as to include a range that extends from the lowest motional mode frequency to the highest motional mode frequency of the ion chain. A universal gate pulse constructed this way can be applied to perform an XX gate operation between an arbitrary pair of ions within an ion chain of an arbitrary length. Hereinafter, an ion chain of length N (i.e., with N ions) may be simply referred to as an "N-ion chain."

Specifically, grid frequencies $\hat{\omega}_q$ are set as a collection of integer-multiples of $$\frac{2\pi}{\tau} \text{ as } \frac{2\pi}{\tau}q,$$

where $\tau$ is a gate duration and q is an integer within an integer interval $I_q$ between a lower bound integer $q_{min}$ and an upper bound integer $q_{max}$ ($q \in I_q=[q_{min}, q_{max}]$) The lower and upper bound integers $q_{min}$, $q_{max}$ determine a lower bound $$\omega_{min} = \frac{2\pi}{\tau}q_{min}$$

and an upper bound $$\omega_{max} = \frac{2\pi}{\tau}q_{max}$$

of the frequency interval, as $[\omega_{min}, \omega_{max}]$. Here, the total number of grid frequencies $\hat{\omega}_q$ is $Q=q_{max}-q_{min}+1$.

For a universal pulse function $g^{(u)}(t)=\sum_{n=1}^{N_A}A_n^{(u)}Q_n(t)$, where $A_n^{(u)}$ are control parameters associated with the basis functions $Q_n(t)$, the approximate phase-space condition can be derived, by replacing the motional mode frequencies $\omega_p$ by the grid frequency $\hat{\omega}_q$ in the phase-space condition described above, up to an inconsequential factor, $$0 = \int_0^{\tau}g^{(u)}(t)e^{i\hat{\omega}_q t}dt = \int_0^{\tau}\sum_{n=1}^{N_A}A_n^{(u)}\sin\left(\frac{2\pi n}{\tau}t\right)e^{i\frac{2\pi}{\tau}qt}dt =$$

$$\sum_{n=1}^{N_A}A_n^{(u)}\int_0^{\tau}\sin\left(\frac{2\pi n}{\tau}t\right)\left\{\cos\left(\frac{2\pi}{\tau}qt\right)+i\sin\left(\frac{2\pi}{\tau}qt\right)\right\}dt =$$

$$i\sum_{n=1}^{N_A}A_n^{(u)}\int_0^{\tau}\sin\left(\frac{2\pi n}{\tau}t\right)\sin\left(\frac{2\pi}{\tau}qt\right)dt,$$

where the last line follows due to the orthogonality of the sine and cosine functions on $[0, \tau]$. It is noted that the time integral is zero for n≠q because of the orthogonality of the sine function on $[0, \tau]$. Thus, the control parameters $A_n^{(u)}$ for n=q are set to zero $$g^{(u)}(t) = \sum_{n \notin I_q}^{N_A}A_n^{(u)}\sin\left(\frac{2\pi n}{\tau}t\right), A_n^{(u)} = 0, n \in I_q,$$

such that the phase-space condition is fulfilled regardless of values of $A_n^{(u)}$ for $n \notin I_q$.

The approximate stabilization conditions of order K with respect to motional mode frequency drift $\Delta\omega_p$ can be derived, by replacing the motional mode frequencies $\omega_p$ by the grid frequency $\hat{\omega}_q$ in the stabilization conditions described above, as $$\left(\frac{\partial^k}{\partial \hat{\omega}_q^k}\right) \int_0^\tau g^{(u)}(t) e^{i\hat{\omega}_q t} dt = 0,$$

and simplified as $$\sum_{\substack{n=1 \\ n \notin I_q}}^{N_A} M_{q'n}^{(u)\mu} A_n^{(u)} = M^{(u)} \overrightarrow{A^{(u)}} = 0$$

in matrix form, for all integers $\mu=1, 2, \ldots, K$ and $q'=1, 2, \ldots, Q \cdot K$, where $\overrightarrow{A^{(u)}}$ is a $N_A$ control parameter vector of $A_n^{(u)}$, and the matrix element $M_{q'n}^{(u)\mu}$ is defined as $$M_{q'n}^{(u)\mu} = \left\{ \frac{1}{(n-q)^\mu} - \frac{(-1)^\mu}{(n+q)^\mu} \right\}, q' = (\mu - 1)K + (q - q_{min} + 1).$$

To fulfill the stabilization conditions, vectors $\overrightarrow{A^{(0)(u)}}$ are selected from the null space of $M^{(u)}$, where the null space is defined as the vector space that maps to zero under the action of $M^{(u)}$. A set of $N_A-(Q \cdot K)$ null-space vectors $\overrightarrow{A^{(0)(u)}}$ derived from this condition corresponds to a universal pulse function $g^{(u)}(t)$ that approximately satisfy the phase-space condition for an arbitrary set of the motional mode frequencies $\omega_p$.

Further, a linear combination of the null space vectors $\overrightarrow{A^{(0)(u)}}$ is computed as a control parameter vector $\overrightarrow{A^{(u)}}$, such that the gate angle condition and the power optimization condition are satisfied.

The gate angle condition is in matrix form as $$\theta_{ij} = \overrightarrow{A^{(u)}}^T D \overrightarrow{A^{(u)}} = \overrightarrow{A^{(u)}}^T S \overrightarrow{A^{(u)}},$$

where the matrix D has elements $D_{mn}$, $$D_{mn} = 4 \sum_{p=1}^{P} \eta_p^i \eta_p^j \int_0^\tau dt_2 \int_0^{t_2} dt_1 \sin\left(\frac{2\pi m}{\tau} t_2\right) \sin\left(\frac{2\pi n}{\tau} t_1\right) \sin[\omega_p(t_2 - t_1)].$$

The power optimization condition is satisfied when the norm $\|\overrightarrow{A^{(u)}}\|$ of the control parameter vector $\overrightarrow{A^{(u)}}$ is minimized. In some embodiments, a negligible amount of infidelity is allowed after applying the phase-space condition, and as a result the power requirement for the delivery of the universal gate pulse can be reduced.

One skilled in the art will appreciate that the universal pulse function $g^{(u)}(t)$ is independent of the motional mode frequencies $\omega_p$ of an ion chain. The universal pulse function $g^{(u)}(t)$ is also independent of the number P of the motional modes $\omega_p$ of an ion chain (which coincides with the number N of ions in the ion chain) as long as the motional mode frequencies $\omega_p$ lie within the preset frequency interval. The universal pulse function $g^{(u)}(t)$, once computed for causing an XX gate operation between a particular pairs of ions in an ion chain having a particular number of ions (i.e., a particular length), can be used to cause an XX gate operation between an arbitrary pair of ions in an ion chain of arbitrary length.

The universal pulse computed according to the method specified herein features relatively small power variations (scale factor) over different pairs of qubits and robustness against a motional mode frequency drift $\Delta\omega_p$. Further, the universal pulse works well for many different numbers of trapped ions, which cannot be said true for non-universal pulses.

Examples of Universal Gate Pulses

Examples of universal gate pulses are described herein to evaluate their performance. Specifically, power requirement of the universal gate pulses and robustness of XX gate operations performed by the application of the universal gate pulses against a motional mode frequency drift $\Delta\omega_p$ are evaluated. As a measure of power requirement, a root-mean-square (RMS) Rabi frequency of a universal gate pulse $g^{(u)}(t)$, defined as $$\sqrt{(1/\tau) \int_0^\tau [\Omega^{(u)}(t)]^2 dt} = \sum_{\substack{n=1 \\ n \notin I_q}}^{N_A} [A_n^{(u)}]^2$$

is used. As a measure of robustness, $\alpha$-infidelity $\varepsilon_\alpha$ and $\chi$-infidelity of an XX gate operation between i-th ion and j-th ion are used. The $\alpha$-infidelity $\varepsilon_\alpha$ is defined as $$\frac{4}{5} \Sigma_p (|\alpha_p^i(\tau)|^2 + |\alpha_p^j(\tau)|^2),$$

and can be used to measure a deviation from the phase-space condition. The $\chi$-infidelity $\varepsilon_\chi$ is defined as $|\chi_{ij} - \theta_{ij}|^2$, and can be used to measure a deviation from the gate angle condition.

FIGS. 4A, 4B, 4C, and 4D illustrate properties of an example universal gate pulse. For FIGS. 4A, 4B, and 4C, the universal pulse function $g^{(u)}(t)$ is constructed for a gate duration $\tau=500$ μs with $N_A$ basis functions $$Q_n(t) = \sin\left(\frac{2\pi n}{\tau} t\right),$$

where $N_A$ is less than about 500. The ions used to determine the pulse are ions 2 and 3. The frequency interval is set to be [2.954, 3.060] MHz and spacing between the adjacent grid frequencies is $$\frac{1}{\tau} = 2 \text{ kHz}.$$

Figure 4A:
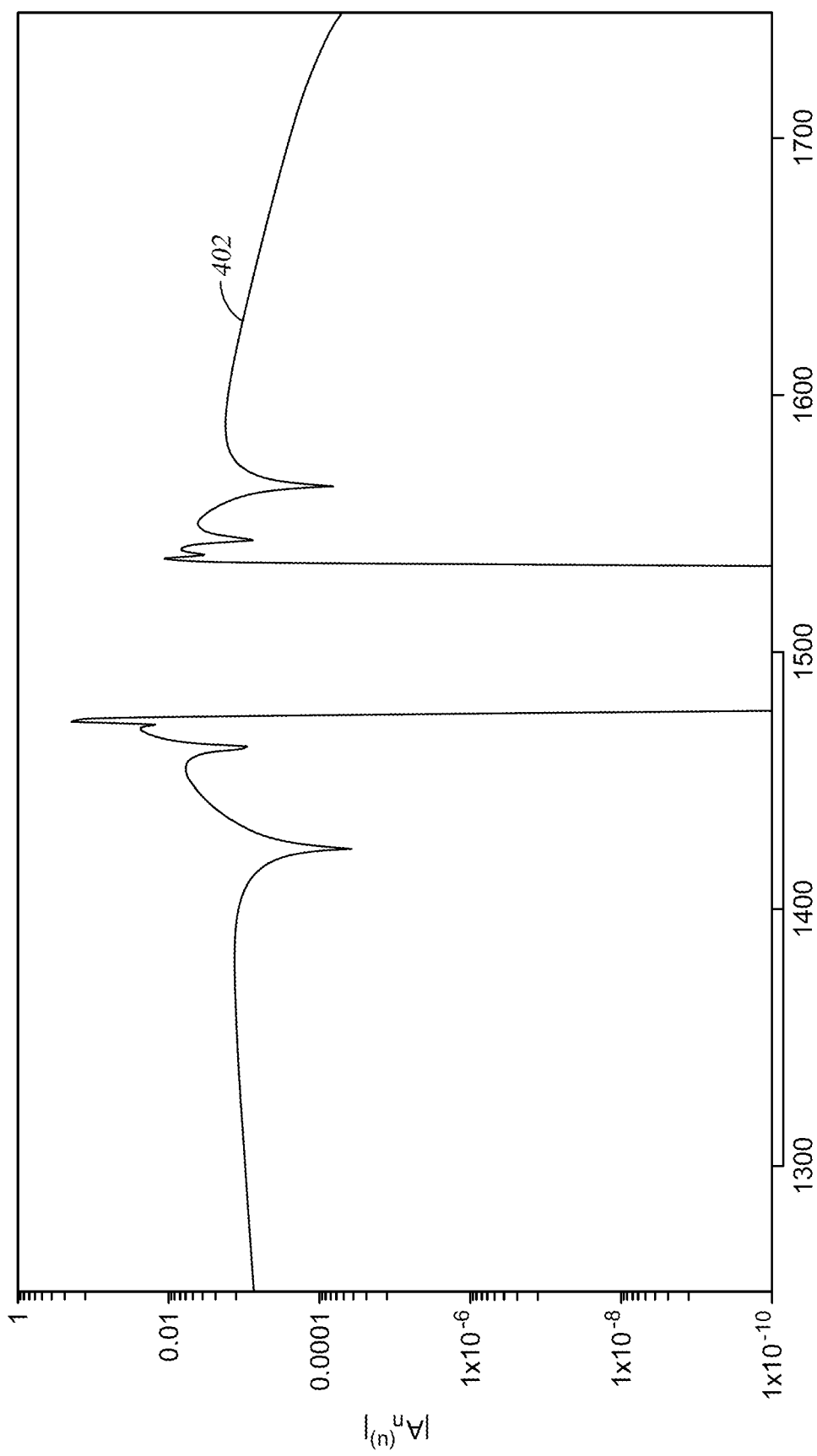
FIGS. 4A, 4B, 4C, and 4D illustrate properties of an example universal gate pulse according to one embodiment.
Figure 4B:
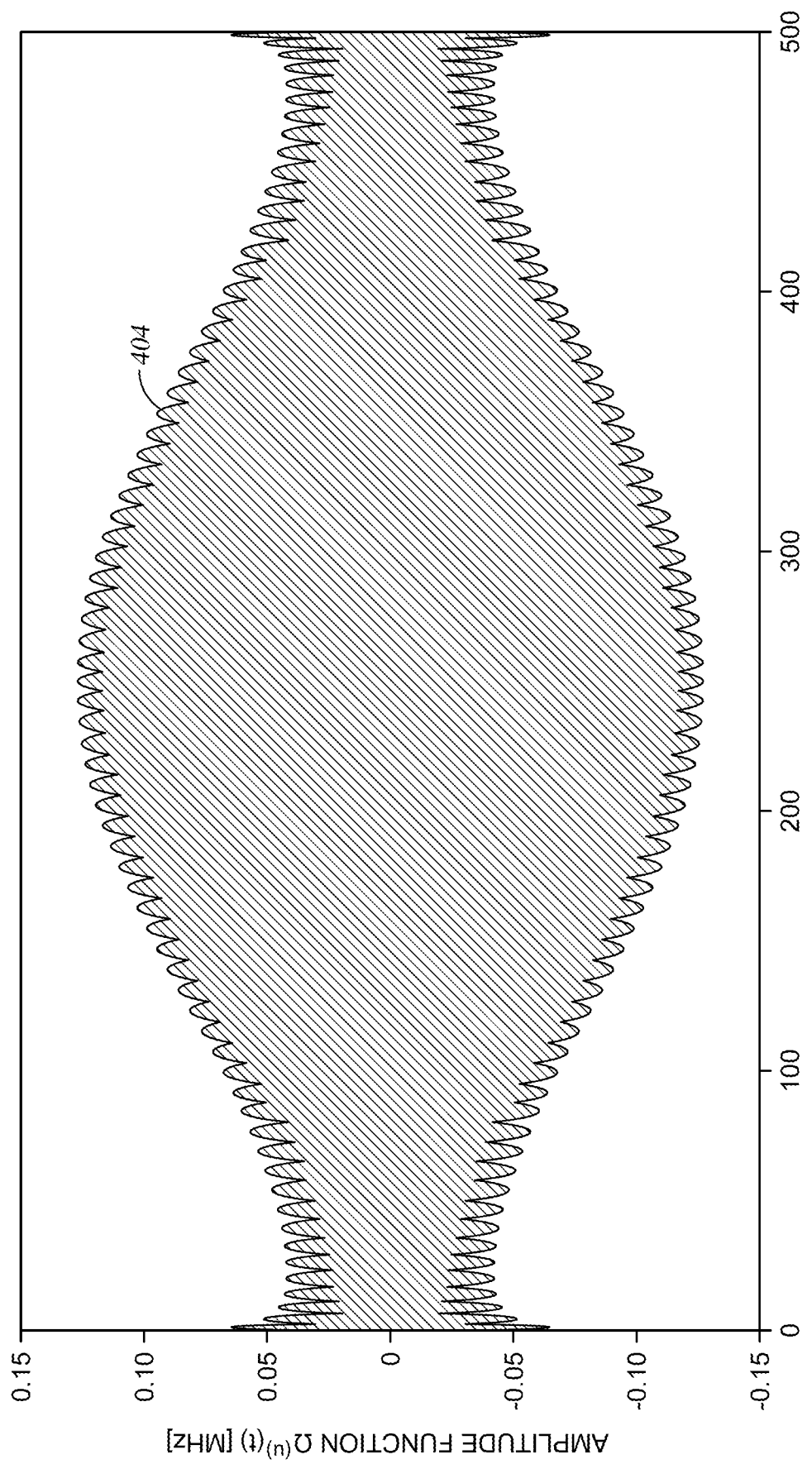
Figure 4C:
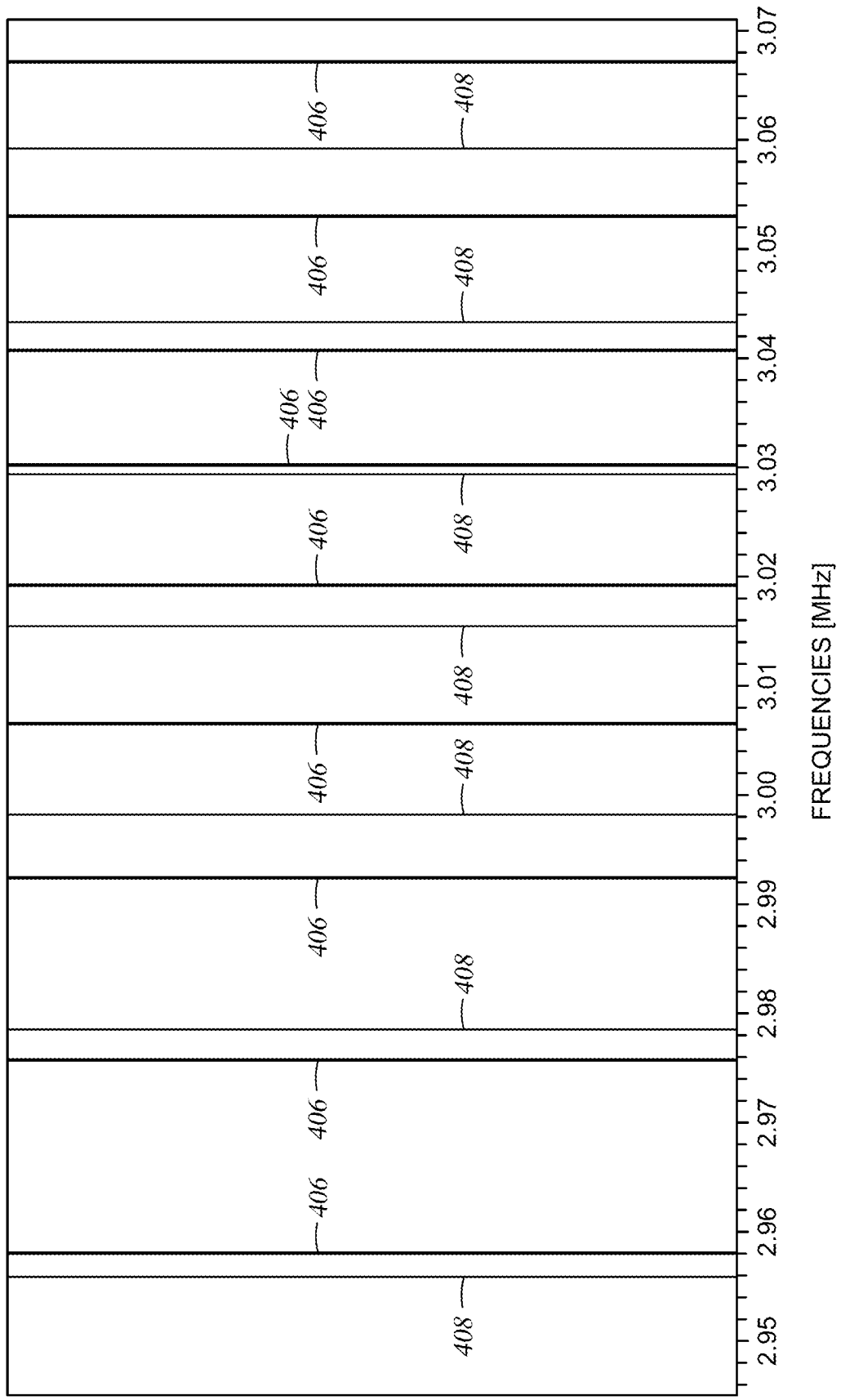
Figure 4D:
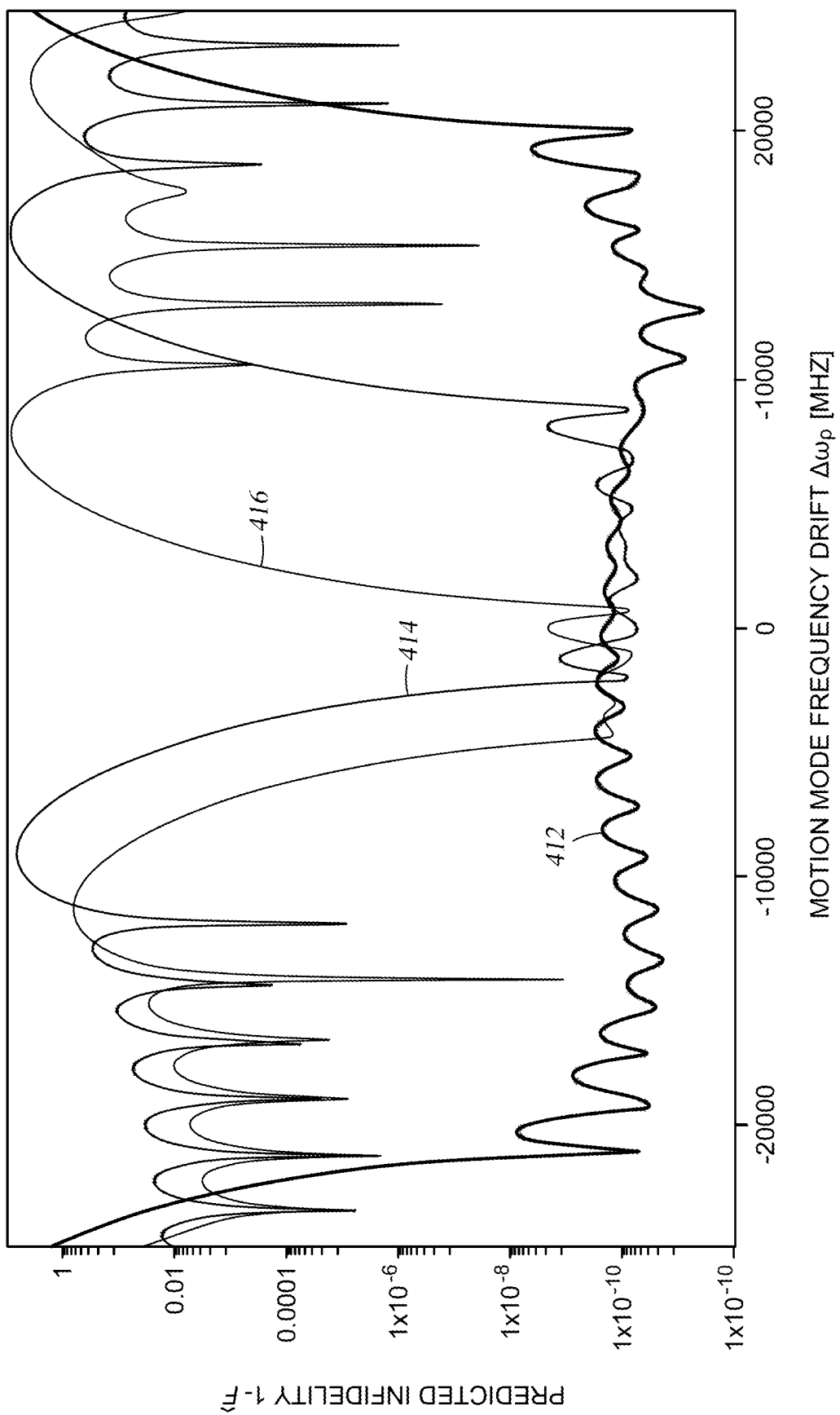

FIG. 4A illustrates the absolute values $|A_n^{(u)}|$ of the control parameters $A_n^{(u)}$ 402 in MHz. The control parameters $A_n^{(u)}$ are set to be zero $n \in I_q = [q_{min}, q_{max}]$, where $q_{min}$ is 1477 and $q_{max}$ is 1530. FIG. 4B illustrates the amplitude function $\Omega^{(u)}(t)$ that is derived from the universal pulse function $g^{(u)}(t)$ having the control parameters $A_n^{(u)}$ shown in FIG. 4A. FIG. 4C illustrates motional mode frequencies $\omega_p/2\pi$ 406 of a 9-ion chain, motional mode frequencies 408 of a 7-ion chain, and grid frequencies $\omega_q$ 410 (shown by the dashed lines). FIG. 4D illustrates theoretically predicted α-infidelity $\varepsilon_\alpha=(1-\hat{F})$ 412 for a 3-ion chain, 414 for a 7-ion chain, and 416 for 9-ion chain, as a function of a motional mode frequency drift $\Delta\omega_p$. In this example, the universal pulse is computed for i-th ion and j-th ion (i=0, j=1) for a 3-ion chain, then applied to 3-, 7-, 9-ion chains for ions i-th ion and j-th ion (i=0, j=1), and all motional mode frequencies $\omega_p$ were shifted uniformly according to $\omega_p \mapsto \omega_p + \Delta\omega_p$. A large window of robustness is observed for all three ion chain lengths, even though the pulse was computed for only one chain length.

Figure 5A:
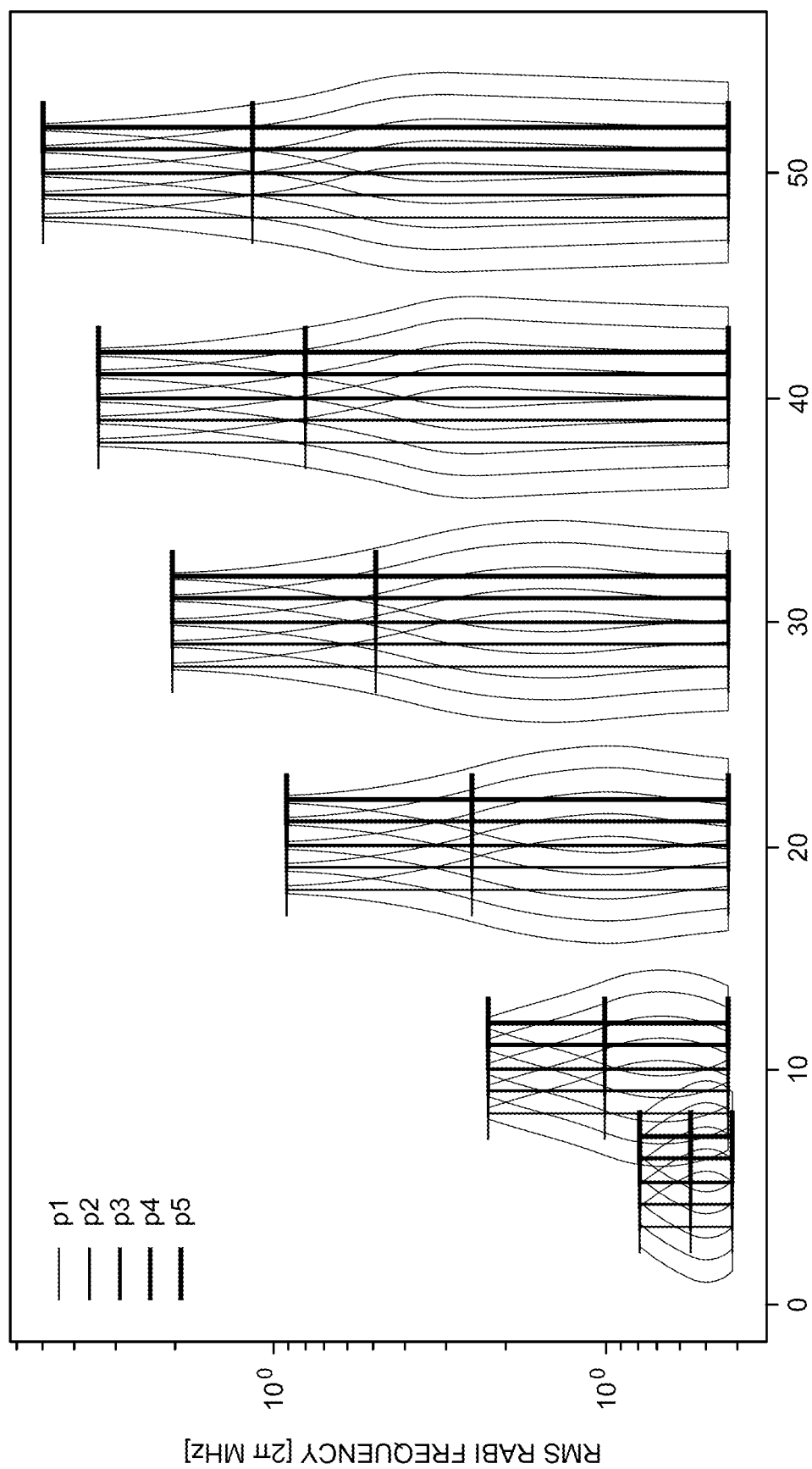
FIGS. 5A, 5B, and 5C illustrate performance of five different example universal gate pulses according to one embodiment.
Figure 5B:
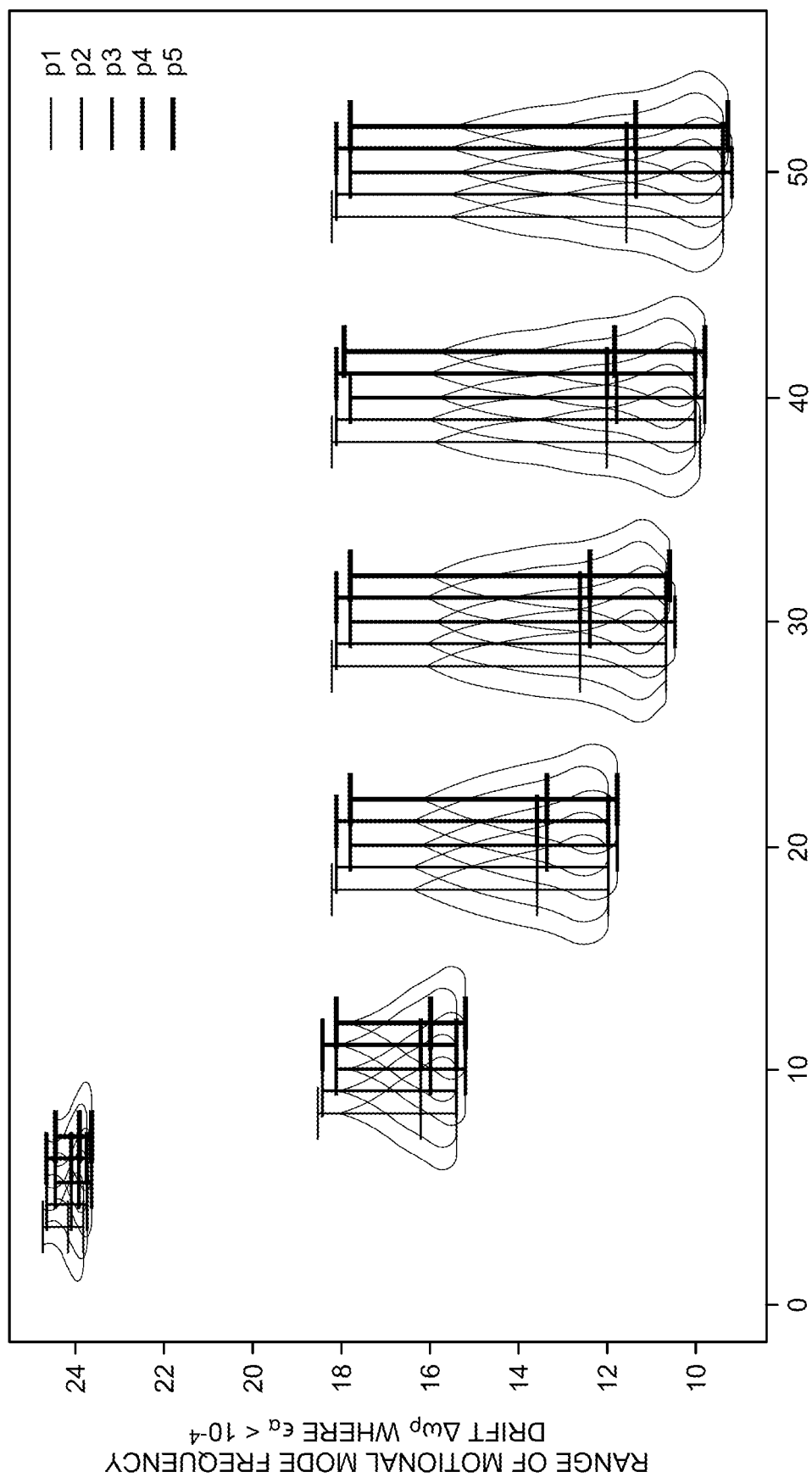
Figure 5C:
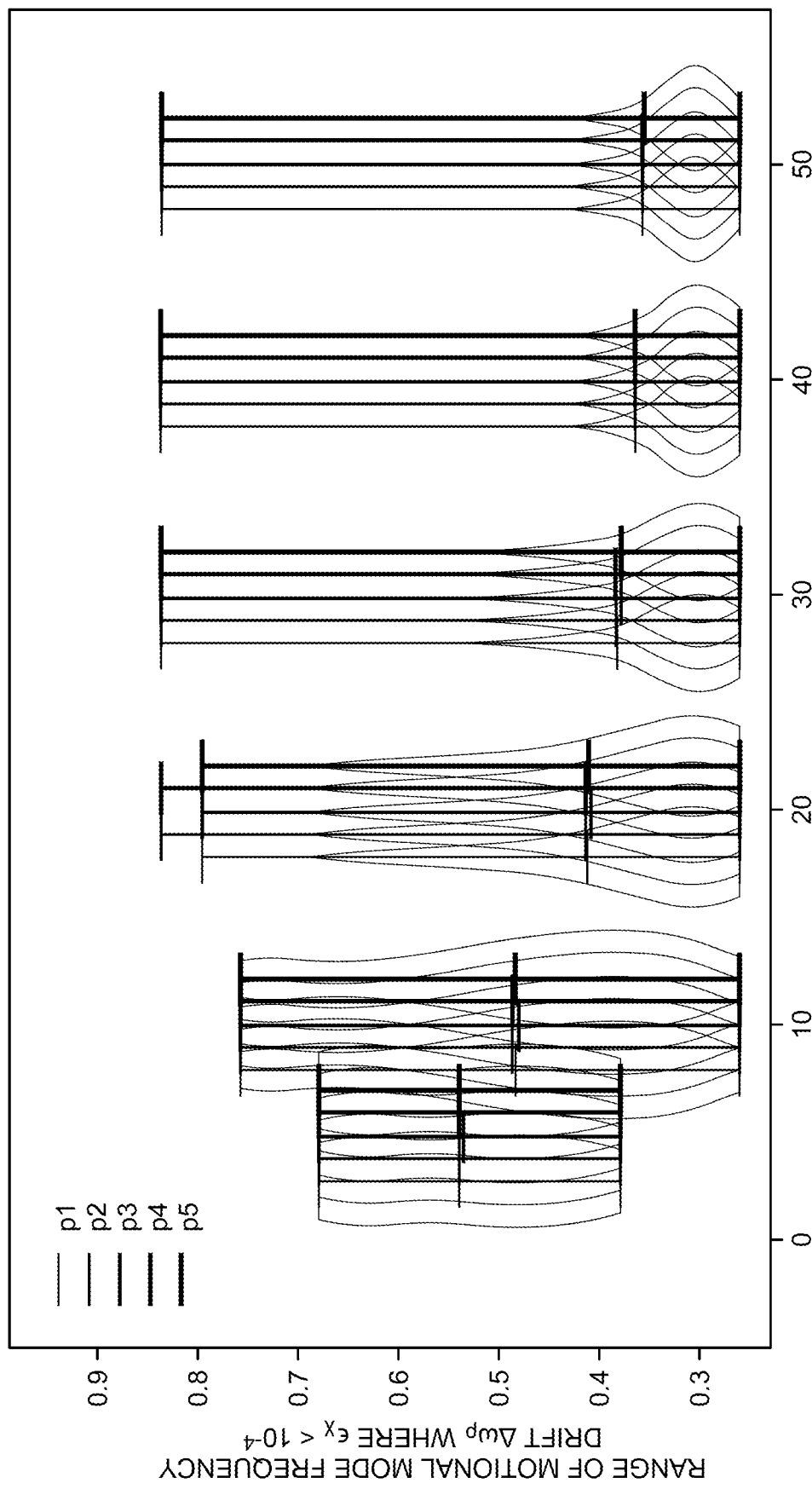

FIGS. 5A, 5B, and 5C illustrate performance of five different example universal gate pulses. In these examples, the universal pulse functions are constructed for a gate duration τ=500 μs with N A basis functions $$Q_n(t) = \sin\left(\frac{2\pi n}{\tau}t\right),$$

where $N_A$ is 199. The frequency interval is set to be [3.874, 3.962] MHz and spacing between the adjacent grid frequencies is $$\frac{1}{\tau} = 2 \text{ kHz}.$$

Five different universal gate pulses p1, p2, p3, p4, and p5 were computed to perform an XX-gate operation with maximal entanglement (i.e., $\theta_{ij}=\pi/2$) on specific pairs of ions (i-th ion and j-th ion) in an ion chain of a specific length N, and all of the universal gate pulses are applied to all pairs of ions in ion chains that have lengths where N equals 5, 10, 20, 30, 40, or 50.

The universal gate pulse p1 was computed for a pair of ions i=0, j=1 in a 2-ion chain. The universal gate pulses p2 and p3 were computed for a pair of ions i=0, j=1, and for a pair of ions i=48, j=49, respectively, for a 50-ion chain. The universal gate pulses p4 and p5 were computed for a pair of ions i=0, j=1, and a pair of i=98, j=99, respectively, for a 100-ion chain.

FIGS. 5A, 5B, and 5C illustrate RMS Rabi frequency, a range of a motional mode frequency drift $\Delta\omega_p$ where the α-infidelity $\varepsilon_\alpha$ is less than $10^{-4}$, and a range of a motional mode frequency drift $\Delta\omega_p$ where the χ-infidelity $\varepsilon_\chi$ are less than $10^{-4}$, respectively. FIGS. 5A, 5B, and 5C show that regardless of which pair of ions for which a universal gate pulse was originally computed for, the performance of the universal pulse is roughly the same across differently positioned pairs of ions in an ion chain.

Figure 6:
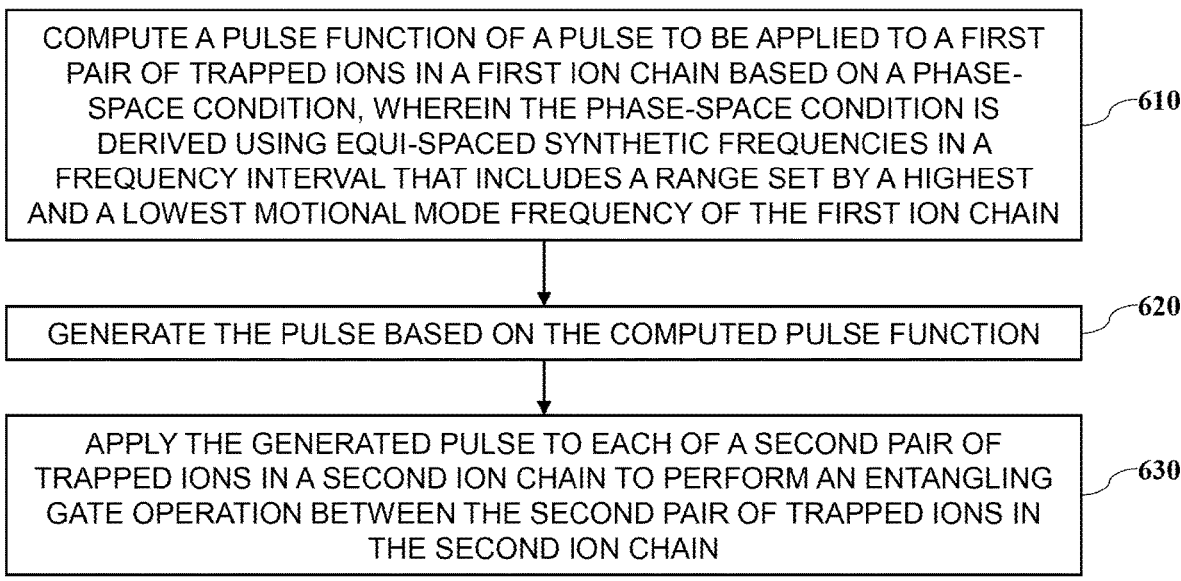
FIG. 6 depicts a flowchart illustrating a method 600 used to perform at least a portion of a computational process.

FIG. 6 depicts a flowchart illustrating a method 600 used to perform at least a portion of a computational process.

In block 610, a pulse function of a pulse to be applied to a first pair of trapped ions in a first ion chain is computed based on a phase-space condition. The phase-space condition is derived using equi-spaced synthetic frequencies in a frequency interval that includes a range set by a highest and a lowest motional mode frequency of the first ion chain.

In block 620, the pulse based on the computed pulse function is generated.

In block 630, the generated pulse is applied to each of a second pair of trapped ions in a second ion chain to perform an entangling gate operation between the second pair of trapped ions in the second ion chain.

In embodiments described herein, pulse shaping methods are described that can be used to perform two-qubit entangling gate operations universally on arbitrary pair of ions in an ion chain of an arbitrary length. This universal gate pulse, once designed for a particular pair of ions in an ion chain, can be applied to other pairs of ions in the ion chain of arbitrary length. Thus, with such universal gate pulses, the complexity of designing of two-qubit entangling gates for all pairs of ions is greatly reduced, which will reduce the overall computational complexity in a large scale trapped-ion quantum computer.

While the foregoing is directed to specific embodiments, other and further embodiments may be devised without departing from the basic scope thereof, and the scope thereof is determined by the claims that follow.

The invention claimed is:

1. A method for performing at least a portion of a computational process, comprising:
   computing a pulse function of a pulse to be applied to a first pair of trapped ions in a first ion chain based on a phase-space condition, wherein the phase-space condition is derived using equi-spaced synthetic frequencies in a frequency interval that includes a range set by a highest and a lowest motional mode frequency of the first ion chain;
   generating the pulse based on the computed pulse function; and
   applying the generated pulse to each of a second pair of trapped ions in a second ion chain to perform an entangling gate operation between the second pair of trapped ions in the second ion chain.

2. The method of claim 1, wherein the number of trapped ions in the second ion chain is different from the number of trapped ions in the first ion chain.

3. The method of claim 1, wherein the second pair of trapped ions are the same as the first pair of trapped ions.

4. The method of claim 1, wherein the second pair of trapped ions are different from the first pair of trapped ions.

5. The method of claim 1, wherein
   the computing of the pulse function is further based on stabilization conditions, and
   the stabilization conditions are derived using the equi-spaced synthetic frequencies.

6. The method of claim 1, wherein the computing of the pulse function is further based on a gate angle condition and a power optimization condition.

7. The method of claim 1, wherein the pulse function is decomposed using basis functions, the computing of the pulse function comprises computing coefficients of the basis functions.

8. An ion trap quantum computing system, comprising:
   a quantum processor comprising a first ion chain comprising a plurality of trapped ions, each trapped ion having two hyperfine states and defining a qubit;
   one or more lasers configured to emit a laser beam, which is provided to the plurality of trapped ions in the first ion chain;
   a classical computer configured to perform operations comprising:
     computing a pulse function of a pulse to be applied to a first pair of trapped ions in a second ion chain based on a phase-space condition, wherein the phase-space condition is derived using equi-spaced synthetic frequencies in a frequency interval that includes a range set by a highest and a lowest motional mode frequency of the second ion chain; and generating the pulse based on the computed pulse function; and a system controller configured to execute a control program to control the one or more lasers to perform operations on the quantum processor, the operations comprising:

applying the generated pulse to each of a second pair of trapped ions in the first ion chain to perform an entangling gate operation between the second pair of trapped ions in the first ion chain; and measuring population of qubit states in the quantum processor, wherein the classical computer is further configured to output the measured population of qubit states in the quantum processor.

9. The ion trap quantum computing system of claim 8, wherein the number of trapped ions in the second ion chain is different from the number of trapped ions in the first ion chain.

10. The ion trap quantum computing system of claim 8, wherein the second pair of trapped ions are the same as the first pair of trapped ions.

11. The ion trap quantum computing system of claim 8, wherein the second pair of trapped ions are different from the first pair of trapped ions.

12. The ion trap quantum computing system of claim 8, wherein the computing of the pulse function is further based on stabilization conditions, and the stabilization conditions are derived using the equi-spaced synthetic frequencies.

13. The ion trap quantum computing system of claim 8, wherein the computing of the pulse function is further based on a gate angle condition and a power optimization condition.

14. The ion trap quantum computing system of claim 8, wherein the pulse function is decomposed using basis functions, the computing of the pulse function comprises computing coefficients of the basis functions.

15. An ion trap quantum computing system, comprising:
a classical computer;
a quantum processor comprising a first ion chain comprising a plurality of trapped ions, each trapped ion having two hyperfine states and defining a qubit;

a system controller configured to execute a control program to control one or more lasers to perform operations on the quantum processor; and non-volatile memory having a number of instructions stored therein which, when executed by one or more processors, causes the ion trap quantum computing system to perform operations comprising:

computing, by the classical computer, a pulse function of a pulse to be applied to a first pair of trapped ions in a second ion chain based on a phase-space condition, wherein the phase-space condition is derived using equi-spaced synthetic frequencies in a frequency interval that includes a range set by a highest and a lowest motional mode frequency of the second ion chain;

generating, by the classical computer, the pulse based on the computed pulse function;

applying, by the system controller, the generated pulse to each of a second pair of trapped ions in the first ion chain to perform an entangling gate operation between the second pair of trapped ions in the first ion chain;

measuring, by the system controller, population of qubit states in the quantum processor; and outputting, by the classical computer, the measured population of qubit states in the quantum processor.

16. The ion trap quantum computing system of claim 15, wherein the number of trapped ions in the second ion chain is different from the number of trapped ions in the first ion chain.

17. The ion trap quantum computing system of claim 15, wherein the second pair of trapped ions are the same or different from the first pair of trapped ions.

18. The ion trap quantum computing system of claim 15, wherein the computing of the pulse function is further based on stabilization conditions, and the stabilization conditions are derived using the equi-spaced synthetic frequencies.

19. The ion trap quantum computing system of claim 15, wherein the computing of the pulse function is further based on a gate angle condition.

20. The ion trap quantum computing system of claim 15, wherein the computing of the pulse function is further based on a power optimization condition.

* * * * *